(12) United States Patent
Clauss et al.

(10) Patent No.: US 9,790,334 B2
(45) Date of Patent: Oct. 17, 2017

(54) POLYMER-GRAPHENE NANOCOMPOSITES

(71) Applicant: RELIANCE INDUSTRIES LIMITED, Mumbai (IN)

(72) Inventors: Allen David Clauss, Madison, WI (US); Guiquan Pan, Middleton, WI (US); Nicholas Richard Wietfeldt, Madison, WI (US); Matthew Clayton Hall, Madison, WI (US); David D. Taft, Traverse City, MI (US)

(73) Assignee: RELIANCE INDUSTRIES LIMITED (IN)

( * ) Notice: Subject to any disclaimer, the term of this patent is extended or adjusted under 35 U.S.C. 154(b) by 0 days.

(21) Appl. No.: 14/776,022

(22) PCT Filed: Mar. 14, 2014

(86) PCT No.: PCT/US2014/028425
§ 371 (c)(1),
(2) Date: Sep. 14, 2015

(87) PCT Pub. No.: WO2014/144139
PCT Pub. Date: Sep. 18, 2014

(65) Prior Publication Data
US 2016/0032061 A1 Feb. 4, 2016

Related U.S. Application Data

(60) Provisional application No. 61/787,407, filed on Mar. 15, 2013.

(51) Int. Cl.
| | | |
|---|---|---|
| *C08J 3/22* | (2006.01) |
| *B82Y 30/00* | (2011.01) |
| *C08K 3/04* | (2006.01) |
| *C08J 3/205* | (2006.01) |
| *C08J 5/00* | (2006.01) |
| *C08L 39/06* | (2006.01) |
| *C08L 77/06* | (2006.01) |

(52) U.S. Cl.
CPC ............. *C08J 3/226* (2013.01); *B82Y 30/00* (2013.01); *C08J 3/2053* (2013.01); *C08J 5/005* (2013.01); *C08K 3/04* (2013.01); *C08L 39/06* (2013.01); *C08L 77/06* (2013.01); *C08J 2323/06* (2013.01); *C08J 2323/12* (2013.01); *C08J 2339/06* (2013.01); *C08J 2363/00* (2013.01); *C08J 2377/06* (2013.01); *C08K 2201/011* (2013.01)

(58) Field of Classification Search
CPC .................................. C08J 3/226; C08K 3/04
USPC .................... 523/351; 524/495, 496
See application file for complete search history.

(56) References Cited

U.S. PATENT DOCUMENTS

| | | | | |
|---|---|---|---|---|
| 2007/0216067 A1* | 9/2007 | Bahr | ..................... | B29C 67/246 264/328.1 |
| 2010/0055365 A1* | 3/2010 | Nakajima | ............. | B29C 41/085 428/36.9 |
| 2010/0176351 A1* | 7/2010 | Ruoff | ..................... | B82Y 30/00 252/510 |
| 2011/0117361 A1 | 5/2011 | Hamilton et al. | | |
| 2011/0220851 A1* | 9/2011 | Sue | .......................... | C08K 7/00 252/507 |
| 2011/0233452 A1* | 9/2011 | Kim | ....................... | B82Y 25/00 252/62.54 |
| 2011/0244744 A1* | 10/2011 | Kwag | ................... | B29C 43/003 442/60 |
| 2012/0261612 A1* | 10/2012 | Suh | ....................... | B82Y 30/00 252/182.3 |
| 2012/0264836 A1* | 10/2012 | Felisari | ................. | C08J 9/0066 521/79 |
| 2012/0270960 A1 | 10/2012 | Felisari et al. | | |

FOREIGN PATENT DOCUMENTS

| | | |
|---|---|---|
| CN | 102424705 | 4/2012 |
| WO | WO2012151433 | * 11/2012 |

OTHER PUBLICATIONS

Wajid, et al. Polymer-Stabilized Graphene Dispersions at High Concentrations in Organic Solvents for Composite Production. Carbon. Feb. 2012, vol. 50, No. 2, pp. 526-534, abstract, ISSN 0008-6223.*
Li, et al. A Simple Route towards High-Concentration Surfactant-Free Graphene Dispersions. Carbon. Jul. 2012, vol. 50, No. 8, pp. 3113-3116, abstract, ISSN 0008-6223.*
International Search Report, International Patent Application No. PCT/US2014/028425, dated Aug. 7, 2014.
Chenlu Bao et al. "Preparation of graphene by pressurized oxidation and multiplex reduction and its polymer nanocomposites by masterbatch-based melt blending" Journal of Materials Chemistry, vol. 22, No. 13, 2012, p. 6088.
European Search Report, EP Patent Application No. 14764697.0, dated Nov. 11, 2016.

* cited by examiner

Primary Examiner — Edward Cain
(74) Attorney, Agent, or Firm — Fish IP Law LLC

(57) ABSTRACT

Provided herein is technology relating to polymer-graphene nanocomposites and particularly, but not exclusively, to methods for producing polymer-graphene nanocomposites using master batches comprising graphene and a polymer or polymer precursor. The resulting polymer-graphene nanocomposites comprise a high degree of exfoliation and dispersion of graphene nanoplatelets within the polymer matrix.

15 Claims, 6 Drawing Sheets

POLYMER-GRAPHENE NANOCOMPOSITES

CROSS-REFERENCE TO RELATED APPLICATIONS

This application is a 371 U.S. National Phase Entry of pending International Application No. PCT/US2014/028425, filed Mar. 14, 2014, which claims priority to U.S. provisional patent application Ser. No. 61/787,407, filed Mar. 15, 2013, the contents of which are incorporated by reference in their entireties.

FIELD OF INVENTION

Provided herein is technology relating to polymer-graphene nanocomposites and particularly, but not exclusively, to methods for producing polymer-graphene nanocomposites using master batches comprising the polymer. The resulting polymer-graphene nanocomposites comprise a high degree of exfoliation and dispersion of graphene nanoplatelets within the polymer matrix.

BACKGROUND

Graphene nanoplatelets have been shown in idealized experiments to enhance a variety of important functional properties of commercially important polymers. For instance, polymer-graphene nanocomposites demonstrate enhanced mechanical properties, electrical conductivity, thermal conductivity, gas/vapor barrier properties, and flame retardency. Accordingly, polymer-graphene nanocomposites consisting of a graphene dispersed in a polymer matrix have been the subject of much research and development activity in recent years. While a significant number of polymer nanocomposites of this type have been developed and/or commercialized, conventional polymer nanocomposites suffer from limitations related to suboptimal exfoliation and dispersion of the graphene in the polymer matrix that attenuates these desirable performance attributes. For example, when graphene in powder form is melt blended with polymers using extruders and conventional fillers under typical compounding conditions, the resultant composites exhibit suboptimal exfoliation and dispersion of the graphene in the polymer matrix. As a result, the materials have performance characteristics that are far below a theoretical magnitude of performance enhancement predicted to be provided by the graphene. Technologies have been developed to produce highly exfoliated solutions, dispersions, slurries, or wet cakes by solvent exfoliation of graphene using solvent systems. Though these materials can be co-dispersed with polymer solutions or polymer dispersions, followed by removal of the solvent to produce polymer nanocomposites with improved exfoliation and dispersion of the nanomaterial, the performance attributes of these composites are also typically below theoretical levels due to incomplete exfoliation and dispersion of the nanomaterial.

SUMMARY

Accordingly, provided herein is technology related to polymer-graphene nanocomposites having a high degree of exfoliation and dispersion. In particular, data collected during the development of embodiments of the technology demonstrated the surprising result that a high degree of exfoliation and dispersion of graphene nanoplatelets can be achieved in graphene/polymer composites made via conventional melt blending methods if the graphene is delivered by way of a master batch comprising graphene and a polymer. In particular, the technology comprises use of a master batch that is specifically prepared according to method embodiments of the technology described herein.

For example, it was surprisingly discovered that PVP, related pyrrolidone and lactam polymers, and a wide range of commercial polymers (e.g., polyacrylamides such as, e.g., poly-N,N-dimethyl acrylamide homopolymer and copolymer) accommodate graphene loadings as high as 50% by weight while maintaining a high degree of exfoliation and dispersion. These highly loaded graphene/polymer master batches can be let down using conventional polymer melt processing techniques to produce graphene polymer nanocomposites containing highly exfoliated graphene levels in the range of 1% to 20% by weight. These materials possess mechanical properties, electrical properties, and vapor barrier properties far exceeding those of similar graphene/polymer nanocomposites made by conventional processing methods.

For example, embodiments of the technology provide a master batch composition for making a polymer nanocomposite, the master batch composition comprising a polymer and at least 20% by weight graphene. In some embodiments, the master batch comprises at least 30% by weight graphene, at least 40% by weight graphene, at least 50% by weight graphene, at least more than 50% by weight graphene. In some embodiments, the graphene is pristine graphene and in some embodiments the graphene is exfoliated graphene. The technology for producing a master batch is not limited in the polymer that is used. In some embodiments, the polymer used to make the master batch is the same polymer that is used to make the polymer nanocomposite. In some embodiments, the polymer used to make the master batch is prepared in-situ after exfoliation in the reactive precursor to the polymer. In some embodiments, the polymer used to make the master batch is different than the polymer used to make the polymer nanocomposite. An exemplary polymer that finds use in the master batch is poly(vinylpyrrolidone).

In some embodiments, the poly(vinylpyrrolidone) is formed in-situ with the exfoliated graphene. For example, in some embodiments, graphene is exfoliated using the polymerizable precursor N-vinyl pyrrolidone and then the N-vinyl pyrrolidone precursor/graphene composition is polymerized to form the poly(vinylpyrrolidone) comprising exfoliated graphene. Accordingly, embodiments of the technology relate to a master batch composition comprising graphene and poly(vinylpyrrolidone). In some embodiments, the master batch composition comprises graphene and a poly(vinylpyrrolidone) in a weight ratio of 1:1 to 1:10.

Other exemplary polymers that find use in the master batch include thermoplastic polymers such as, e.g., high density polyethylene, low density polyethylene, polycarbonate, and polypropylene. Accordingly, embodiments of the technology relate to a master batch composition comprising graphene and a thermoplastic polymer. In some embodiments, the master batch composition comprises graphene and a thermoplastic polymer in a weight ratio of 1:1 to 1:5.

In some embodiments, the master batch comprises graphene having an average thickness that is less than 10 atomic layers, a minimum of 5% of the graphene is single atomic layer graphene, and the oxygen content of the graphene is less than 1%. In some embodiments, the master batch comprises graphene having an average thickness that is less than 5 atomic layers, a minimum of 10% of the graphene is single atomic layer graphene, and the oxygen content of the graphene is less than 1%. In some embodiments, the master batch comprises graphene having an average thickness that is less than 3 atomic layers, a minimum of 20% of the graphene is single atomic layer graphene, and the oxygen content of the graphene is less than 0.5%. In some embodiments, less than 10% of the graphene nanoplatelets have a maximum diameter of less than 0.5 microns.

Furthermore, in some embodiments of master batch compositions comprising poly(vinylpyrrolidone), the poly(vinylpyrrolidone) has a number average molecular weight of less than or equal to approximately 10,000 u.

The technology is related to polymer nanocomposites, e.g., that are made using the master batch technology provided herein. The master batch technology allows one to make polymer nanocomposites having amounts and distributions of graphene within the polymer matrix that are improved relative to conventional technologies. For example, embodiments provide a polymer nanocomposite comprising a polymer and graphene produced by a method comprising the steps of providing a master batch composition as described herein; and mixing some or all of the master batch with a polymer to provide the polymer nanocomposite. In some embodiments, the method comprises melt blending, e.g., to mix the polymer and the master batch. Some embodiments provide further processing of the polymer nanocomposite, such as embodiments that comprise extruding the polymer nanocomposite. Embodiments of the polymer nanocomposites provided herein comprise 0.5% to 50% graphene by weight.

The technology also provides embodiments related to a method of making a master batch composition for producing a polymer nanocomposite, the method comprising mixing a slurry of graphene in a solvent system with a polymer; and removing the solvent system to produce a master batch comprising from 15% to 60% (e.g., 35% to 50%) graphene. In some embodiments the mixing is high shear mixing. In some embodiments the polymer is a poly(vinylpyrrolidone), a polyacrylamide, or a thermoplastic polymer. The graphene is provided in a master batch produced according to the technology; e.g., the slurry of graphene is produced by treating graphite in a pyrrolidone (e.g., an N-alkyl-pyrrolidone (e.g., N-methyl pyrrolidone), an N-alkenyl-pyrrolidone (e.g., N-vinyl pyrrolidone), etc.) to produce solvent exfoliated graphene in the pyrrolidone; removing most of the pyrrolidone to produce a concentrated solution or dispersion of graphene in the pyrrolidone; and adding a solvent to the graphene in pyrrolidone to produce the slurry of graphene in the solvent system. Exemplary solvents for use in the solvent system of the technology are xylenes or methanol. In some embodiments the pyrrolidone is a polymerizable pyrrolidone (e.g., an N-alkenyl pyrrolidone such as N-vinyl pyrrolidone), which is removed from the composition by polymerization to form a polymer such as poly(vinylpyrrolidone).

In some embodiments, the concentrated solution or dispersion of graphene in the pyrrolidone comprises 2% to 8% graphene. The technology is not limited in the method of removing the solvent; for example, in some embodiments filtration is used to remove the pyrrolidone. As above, in some embodiments the solvent is removed by converting it by polymerization to form a polymer, e.g., a poly(vinylpyrrolidone). In some embodiments, a mixture of reactive exfoliation solvents may be used. For example, in some embodiments, one or more of N-vinyl pyrrolidone or N, N-dimethyl acrylamide is used. In some embodiments, a copolymerizable monomer is used with one or more reactive exfoliation solvents (e.g., N-vinyl pyrrolidone). Exemplary copolymerizable monomers include, but are not limited to, dialkyfumarates, dialkyl maleates, vinyl alky ethers, and vinyl acetate. In some embodiments, the solvent system comprises 2% to 30% N-alkyl-pyrrolidone and 70% to 98% solvent.

In another aspect, the technology is related to embodiments of a master batch composition for making a polymer nanocomposite made by a method described herein.

Embodiments of the technology are provided relating to a method of making a polymer nanocomposite comprising producing a master batch according to a method described herein; and mixing some or all the master batch with a polymer to provide the polymer nanocomposite. In some embodiments, the mixing comprises melt blending and in some embodiments the method further comprises extruding the polymer nanocomposite. An exemplary polymer nanocomposite produced by the methods described comprises 0.5% to 50% graphene by weight.

Exemplary embodiments provide a method of making a graphene/poly(vinylpyrrolidone) master batch comprising concentrating a solution or stable dispersion of exfoliated graphene above the solubility and stable dispersion limit of the exfoliated graphene; dissolving PVP in the graphene/solvent slurry in a ratio of 1:1 to 1:10 graphene to PVP; and removing the solvent with continuous mixing to isolate the resultant graphene/PVP master batch as a solid.

Another embodiment provides a method of making a graphene/poly(vinylpyrrolidone) master batch by solvent exfoliating the polymer in a monomer precursor (e.g., N-vinyl pyrrolidone) and then polymerizing the monomer precursor (e.g., N-vinyl pyrrolidone) to a polymer (e.g., poly(vinylpyrrolidone)), In addition, some embodiments provide a method of making a graphene/polymer composite comprising melt blending a poly(vinylpyrrolidone)/graphene nanoplatelet master batch composition comprising greater than 10% graphene nanoplatelets by weight with a second polymer composition, wherein said second polymer comprises a polymer other than poly(vinylpyrrolidone). In some embodiments are provided a graphene/polymer master batch composition comprising a thermoplastic polymer comprising greater than 15%, e.g., greater than 20% by weight, of highly dispersed and exfoliated pristine graphene nanoplatelets such that the average thickness of the nanoplatelets does not exceed 5 atomic layers, a minimum of 10% of the nanoplatelets are single atomic layer graphene, and the oxygen content of the graphene is less than 1%. In some embodiments of the composition the average thickness of the graphene nanoplatelets does not exceed 3 atomic layers, a minimum of 20% of the nanoplatelets are single atomic layer graphene, and the oxygen content of the graphene is less than 0.5%. In some embodiments of the composition, less than 10% of the nanoplatelets have a maximum diameter of less than 0.5 microns. In some embodiments, the composition comprises greater than 30% w/w graphene nanoplatelets and in some embodiments the composition comprises greater than 40% w/w graphene nanoplatelets.

In an exemplary method embodiment for making a graphene/thermoplastic master batch consisting of the steps, the method comprises concentrating a solution or stable dispersion of exfoliated graphene above the solubility and stable dispersion limit of the exfoliated graphene; dissolving a thermoplastic polymer in the graphene/solvent slurry in a ratio of 1:1 to 1:5 graphene to polymer; and removing the solvent with continuous mixing to isolate the resultant graphene/polymer master batch as a solid.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
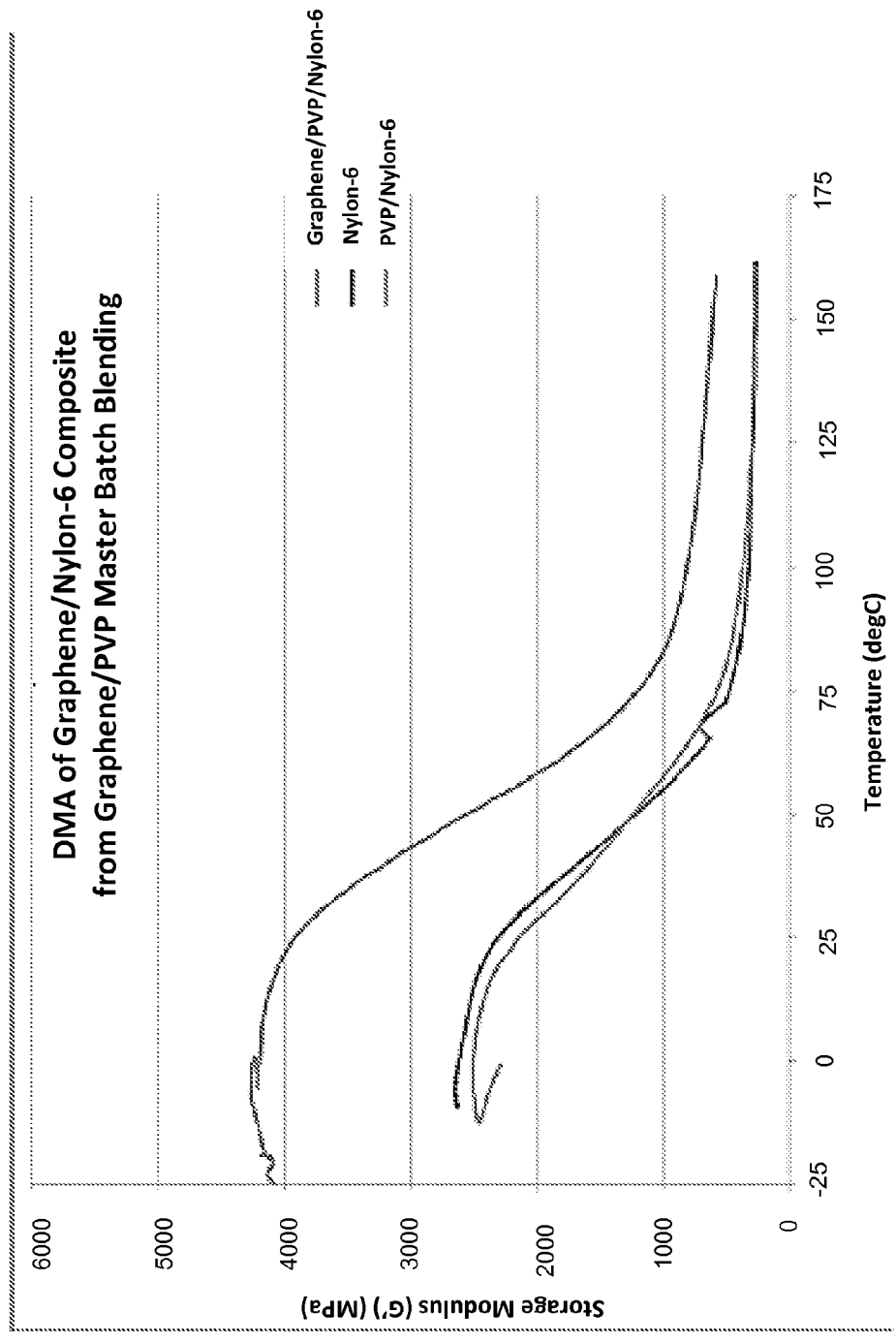
FIG. 1 is a plot showing dynamic mechanical analysis of a polymer nanocomposite produced according to an embodiment of the technology using a graphene/PVP master batch.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to polymer-graphene nanocomposites and particularly, but not exclusively, to methods for producing polymer-graphene nanocomposites using master batches comprising a polymer. The resulting polymer-graphene nanocomposites comprise a high degree of exfoliation and dispersion of graphene nanoplatelets within the polymer matrix. In the description of the technology provided, the section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, "graphene" refers to an allotrope of carbon having a structure that is a single planar sheet of $sp^2$-bonded carbon atoms arranged in a honeycomb crystal lattice. As used herein, the term graphene includes but is not limited to graphene in the form of a one-atom-thick (monolayer) sheet. As such, the term "graphene" also refers to the form of graphene in which many graphene sheets are stacked together, e.g., as present in the crystalline or "flake" form of graphite. As used herein, the term "graphene" refers to monolayer (single layer) or multilayer graphene with a nanoscale thickness (e.g., less than 20 and preferably less than 10 layers thick).

As used herein, the term "pristine" means not functionalized, modified, or chemically reacted with other elements such as oxygen.

As used herein, a "nanomaterial" is a material having one or more external dimensions in the size range of 1 nm to 100 nm. The "morphology" of a nanomaterial refers to the shape of the discrete nanomaterial particles.

Embodiments of the Technology

The technology provides embodiments of methods and compositions related to polymer-graphene nanocomposites and particularly, but not exclusively, to methods for producing polymer-graphene nanocomposites using master batches comprising a polymer (e.g., polyvinyl lactams such as, e.g., poly(vinylpyrrolidone), polyacrylamides such as, e.g., poly (N,N-dimethyl acrylamide), polyamides (e.g., poly(alkylamides), etc.). Although the disclosure herein refers to certain illustrated embodiments, it is to be understood that these embodiments are presented by way of example and not by way of limitation.

1. Methods

In some embodiments, the technology provides a method for producing a master batch comprising graphene for producing a polymer nanocomposite comprising graphene. Graphene is an allotrope of carbon having a structure that is a single planar sheet of $sp^2$-bonded carbon atoms arranged in a honeycomb crystal lattice. As a result of its molecular composition and structure, graphene has unique physical properties (e.g., electronic properties, optical properties, thermal properties, quantum-based properties, etc.) and is amongst the strongest materials known. In some embodiments, graphene is a one-atom-thick (monolayer) sheet and in some embodiments (e.g., "few-layer" graphene), many graphene sheets are stacked together. Typically, graphene has a thickness less than 100 nm, e.g., less than 50 nm, e.g., less than 20 nm, e.g., less than 10 nm, e.g., less than 5 nm.

The technology is not limited in the source of the graphene. For example, in some embodiments graphene (e.g., pristine graphene) is produced by solvent exfoliation of graphite, e.g., as described in U.S. Pat. Appl. Pub. No. 2011/0117361. In some embodiments, graphene is a composition and/or is produced by a method as described in U.S. Pat. Appl. Ser. No. 61/786,944, which is incorporated herein by reference. Similar procedures produce monolayer graphene from multi-layer graphene, few-layer graphene, or bulk graphene. As discussed therein, solvents for producing graphene from graphite include those with a Flory-Huggins parameter (chi value) of less than 0.10, e.g., in some embodiments less than 0.01, and that have a surface tension of approximately 38.4 $mJ/m^2$ to 40.4 $mJ/m^2$. Exemplary solvents for graphene that have these characteristics include but are not limited to N-alkyl lactams and N-alkenyl lactams, e.g., N-alkyl pyrrolidones such as cyclohexyl-2-pyrrolidone, N-methylpyrrolidone, and N-octyl-pyrrolidone; and N-alkenyl pyrrolidones such as N-vinyl pyrrolidones; and mixtures thereof.

In some embodiments, graphene is produced by exfoliation of graphite, e.g., by chemical, physical, or other means. See, e.g., U.S. Pat. No. 6,667,100. In some embodiments, graphene is produced from graphite using physical methods such as using an adhesive surface to remove graphene sheets from graphite and/or abrading graphite. In some embodiments, graphene is produced from graphite by sonication.

In some embodiments, graphene is synthesized (e.g., de novo). For example, in some embodiments graphene is epitaxially grown on various substrates, e.g., a silicon carbide (SiC) or iridium (Ir) substrate. In some embodiments, graphene is produced by transfer from nickel. In some embodiments, graphene is produced by chemical vapor deposition on thin nickel or copper films, e.g., using methane, ethane, propane, etc. as a carbon source.

In some embodiments, graphene is produced by reduction of graphite oxide. In some embodiments, graphene is produced by growth in metal-carbon melts, for example, by dissolving carbon atoms inside a transition metal melt at a certain temperature and then allowing the dissolved carbon to precipitate out at lower temperatures as graphene. Methods for production of graphene include, e.g., reduction of ethanol by sodium metal, followed by pyrolysis of the ethoxide product, and washing with water to remove sodium salts from the graphene product. Also, graphene can be produced by the exothermic combustion reaction of certain Group I and II metals, including magnesium, and carbon bearing gases, including carbon dioxide. In addition, nanotubes and graphene sheets are interconvertible. That is, by "cutting" (e.g., by action of potassium permanganate and sulfuric acid or by plasma etching) along the length of a carbon nanotube the tube may "unroll" to from a graphene sheet.

For methods of producing graphene from graphite, the technology is not limited in the types and/or sources of graphite. For example, the graphite used to make graphene may be natural or synthetic. The graphite may be in the alpha (hexagonal) and/or beta (rhombohedral) forms, and may be either flat or buckled. The alpha form is convertible to the beta form through mechanical treatment; the beta form is convertible to the alpha form by heating above 1300° C. Natural graphite (e.g., obtained by mining and purification of graphite-containing rock) may be, e.g., crystalline flake graphite, amorphous graphite, lump graphite (also called vein graphite), or mixtures of these forms. Synthetic graphite may be, e.g., high-quality (e.g., highly ordered pyrolytic graphite or highly oriented pyrolytic graphite) graphite, e.g., having an angular spread between the graphite sheets of less than 1°. Synthetic graphite may be produced by heating carborundum, e.g., to temperatures above 4000° C. In some embodiments, the graphite is produced by recycling graphite-containing manufactures (e.g., electrodes). Commercial sources of graphite include, e.g., Technical Grade Graphite from Sargent Chemical Company; a common, commercial 350 Mesh Mr. Zip Graphite Powder from AGS Corporation of Michigan; Asbury Carbons A-625 synthetic graphite, and/or synthetic graphite powder from, e.g., Sigma-Aldrich.

In an exemplary embodiment, a solution or dispersion of graphene in a first solvent (e.g., a pyrrolidone, e.g., an N-alkyl-pyrrolidone, e.g., N-methyl pyrrolidone, or an N-alkenyl pyrrolidone, e.g., N-vinyl pyrrolidone; an acrylamide, e.g., a N,N-dialkyl acrylamide, e.g., N,N-dimethyl acrylamide) is produced. In some embodiments, the solution or dispersion of graphene in the first solvent is a solution or dispersion comprising graphene at 0.1%, 0.2%, 0.3%, 0.4%, 0.5%, 0.6%, 0.7%, 0.8%, 0.9%, or 1.0% or more by weight. In some embodiments, the solution or dispersion is a solution or dispersion comprising exfoliated graphene and in some embodiments the solution or dispersion comprises pristine graphene.

In some embodiments, a portion of the first solvent is removed from the graphene solution or dispersion, for instance, by filtration, evaporation (e.g., in some embodiments aided by heating, vacuum methods, and/or by placing in a low pressure system such as a rotatory evaporator), and like methods. For instance, in some embodiments the solution or dispersion is concentrated by micropore filtration through a membrane filter (e.g., having a 0.2-μm nominal cutoff). In exemplary embodiments, approximately 70%, 75%, 80%, 85%, 90%, 92%, or 95% of the first solvent is removed to provide an approximately 30%, 25%, 20%, 15%, 10%, 8%, or 5% slurry of graphene in the first solvent. In some embodiments, an additional (second) solvent is added to the graphene slurry. In some embodiments the additional (second) solvent is added in a 1:1 ratio by volume relative to the graphene slurry to which it is added. In some embodiments, this ratio varies from 0.5:1.0 to 1.0:0.5 (e.g., 0.5:1.0, 0.75:1.0, 1.0:1.0, 1.0:0.75, 1.0:0.5). Next, in some embodiments, the first and second solvent are removed from the slurry as above; and, in some embodiments, the addition of the second solvent and the solvent removal steps are repeated one or more times. In some embodiments, the process provides a slurry or dispersion of graphene in the first and second solvents. In some embodiments, the solvent system comprising the first and second solvents comprises approximately 1% to 40% of the first solvent (e.g., a pyrrolidone, e.g., an N-alkyl-pyrrolidone, e.g., N-methyl pyrrolidone, or an N-alkenyl pyrrolidone, e.g., N-vinyl pyrrolidone; an acrylamide, e.g., a N,N-dialkyl acrylamide, e.g., N,N-dimethyl acrylamide) and 60% to 99% of the second solvent. In some embodiments, the second solvent is a xylene or mixture of xylenes and in some embodiments the second solvent is an alcohol such as methanol. The concentration of graphene in the solvent system is, e.g., from 1% to 10%, e.g., 1%, 2%, 3%, 4%, 5%, 6%, 7%, 8%, 9%, or 10% or more. In some embodiments, the concentration of graphene in the solvent system is 5%. In some embodiments, the first solvent is a polymerizable solvent, e.g., an N-alkenyl pyrrolidone, e.g., N-vinyl pyrrolidone; an acrylamide, e.g., a N,N-dialkyl acrylamide, e.g., N,N-dimethyl acrylamide; or the like; and mixtures thereof.

In some embodiments, a separate solution of a polymer (e.g., a thermoplastic polymer, e.g., high density polyethylene, low density polyethylene, polycarbonate, and/or polypropylene) in the second solvent is prepared. Examples of suitable polymers are discussed below. For example, in an exemplary embodiment, a solution of polypropylene in xylenes is produced by stirring polypropylene pellets into xylenes and boiling with stirring until dissolution is complete. In some embodiments, the polymer in the second solvent is high shear mixed, e.g., in some embodiments with a high shear mixing screen. Then, in some embodiments, the graphene slurry (e.g., a 5% graphene slurry master batch produced as above) is added to the polymer in the second solvent and mixed, e.g., high shear mixed, e.g., for 1 to 30 minutes (e.g., 5, 10, 15, 20, 25, or 30 minutes).

In some embodiments, a polymer is added directly to the graphene slurry (e.g., a 5% graphene slurry master batch produced as above) and mixed, e.g., high shear mixed, e.g., for 1 to 30 minutes (e.g., 5, 10, 15, 20, 25, or 30 minutes). In some embodiments, the polymer is a solid (e.g., pellets, powder, granules, etc.) and in some embodiments the polymer is a liquid.

For example, embodiments provide for the addition of a poly(N-vinyl lactam) (e.g., poly(vinylpyrrolidone)) powder to the graphene slurry. In some embodiments, the poly(N-vinyl lactam) (e.g., poly(vinylpyrrolidone)) is dissolved in the slurry by heating and stirring. Exemplary embodiments comprise use of poly(vinylpyrrolidone) (PVP), which is a water-soluble polymer made from the monomer N-vinylpyrrolidone. Polyvinylpolypyrrolidone (PVPP) is a highly cross-linked modification of poly(vinylpyrrolidone). The extent of cross-linking can vary and there is no defined threshold establishing a division between PVP and PVPP. Accordingly, the term poly(vinylpyrrolidone) is used herein to refer to poly(vinylpyrrolidone) in various states of cross-linked polymerization, including preparations of poly(vinylpyrrolidone) (PVP) that may also be known in the art as PVPP. The synthesis and physical properties of PVP and PVPP are well-known in the art (e.g., see Haaf el (1985) "Polymers of N-vinylpyrrolidone; synthesis, characterization, and uses" *Polymer J.* 17(1): 143). The PVP is provided in forms that allow its introduction into a sample that is to be processed, e.g., as a powder, slurry, suspension, in granules, and the like.

After mixing the graphene slurry and the polymer (e.g., a thermoplastic polymer (e.g., high density polyethylene, low density polyethylene, polycarbonate, and/or polypropylene); a poly(alkenyl lactam) (e.g., poly(vinyl lactam)); etc.), embodiments provide that solvent is removed to provide a wet cake comprising graphene, solvents (e.g., remaining portions of the first and second solvents), and polymer. Exemplary methods of solvent removal include but are not limited to heating (e.g., boiling), using a rotatory evaporator, heating in a vacuum oven (e.g., at 40° C., 50° C., 60° C., 70° C., 80° C., 90° C., 100° C., 110° C., or at 120° C. or more, depending on the solvent, and under less than 5, or at approximately 5, 10, 25, 50, 75, or 100 mmHg of pressure), drying, and combinations of these methods. The final master batch of graphene comprises approximately 30%, 35%, 40%, 45%, 50%, 55% or more of graphene and approximately 70%, 65%, 60%, 55%, 50%, 45%, or less of the polymer (e.g., a thermoplastic polymer (e.g., high density polyethylene, low density polyethylene, polycarbonate, and/or polypropylene); a poly(alkenyl lactam) (e.g., poly(vinyl lactam)); etc.).

In some embodiments, the first solvent is reactive (polymerizable) and the reactive solvent is removed by conversion of the reactive solvent to a polymer in the presence of the exfoliated graphene in the slurry master batch. In some embodiments, this polymerization is conducted in the presence of added solvent. An exemplary reactive solvent is N-vinyl pyrrolidone. Another exemplary reactive solvent is N,N-dimethyl acrylamide.

The master batch is used in some embodiments for the preparation of a polymer nanocomposite. For example, in some embodiments, the graphene/polymer master batch is mixed (e.g., by melt blending or other methods known in the art) with a polymer to make the nanocomposite. In some embodiments, the polymer of the graphene/polymer master batch and the polymer added to make the polymer nanocomposite are the same polymer, e.g., polyvinyl pyrrolidone; in some embodiments, the polymer of the graphene/polymer master batch and the polymer added to make the polymer nanocomposite are related polymers (e.g., having similar structure but different molecular weight), e.g., low molecular weight poly(vinylpyrrolidone) and high molecular weight poly(vinylpyrrolidone); and, in some embodiments, the polymer of the graphene/polymer master batch and the polymer added to make the polymer nanocomposite are different polymers, e.g., poly(vinylpyrrolidone) and polyamide, polyethylene, polycarbonate, polypropylene, etc. In some embodiments, the polymer nanocomposite is further processed, e.g., by extrusion or other methods know in the art for finishing polymer compositions.

In some embodiments the master batch is made by mixing the graphene solvent dispersion with a liquid epoxy resin monomer and removing the solvent. The epoxy resin monomer master batch can then be let down (diluted) with additional epoxy resin monomer and treated with hardener to polymerize (cure) it to form the final polymer composite.

The technology is not limited in the polymer that is used to make the polymer nanocomposite. For example, in some embodiments, the polymer is a thermoplastic, a thermoset, and/or an elastomer. In some embodiments, the polymer is an epoxy. In some embodiments, the polymer is a polypropylene. In some embodiments, the polymer is a polyester, a polyamide, a polystyrene, a polyvinyl (e.g., a polyvinyl chloride), a polyimide, a polydimethylsiloxane, a polyolefin, a polycarbonate, a nitrile rubber, a poly(styrene-co-acrylic acid), a polyurethane, a silicone, a poly(ethylene-co-vinyl acetate), a poly(methylmethacrylate), a butyl rubber, an acrylic rubber, a poly(N-vinyl pyrrolidone), a poly(ethylene oxide), an ethylene-propylene-diene monomer rubber, natural rubber, styrene butadiene rubber, poly(ethylene-co-octene), halobutyl rubber, silylated-sulfonated poly(ether ether ketone), poly(benzimidizole), fluorinated poly(benzimidizole), sulfonated polystyrene ethylene butylene polystyrene, hydroxylated polymers, hyperbranched polymers, cross linked sulfonated poly(ether ether ketone), sulfonated polybenzimidazole copolymer, phosphoric acid doped polybenzimidazole, sulfonated polyarylenethioethersulfone, sulfonated polybenzimidazole, poly(phenylene-vinylene), polythiopene, polyfluorene, polyaniline, polypyrrole, polyamidoamine dendrimer, polyacrylamide, a vinyl ester, an epoxy, an unsaturated polyester, and polystyrene butadiene. In addition, the technology finds use with biomolecules such as proteins, DNA, RNA, lipids, sugars, and crystalline cellulose.

In some embodiments, the polymer nanocomposite compositions produced by this method comprise graphene at approximately 0.1% to 50% graphene in a polymer matrix.

2. Uses

The polymer nanocomposites made from the master batch technology provided herein find use in many applications. For example, some uses include providing a polymer nanocomposite that is slightly electrically conductive but that has a relatively high electrical resistance for use in protection against static electricity and as an electrical shielding material. Also, a conductive polymer nanocomposite material having a relatively low electrical resistance may be used for printed wiring, in batteries, in photoelectric devices (e.g., solar cells), etc.

A flame retardant material may be produced, e.g., by dispersing nanomaterials (e.g., graphene and carbon nanotubes) in a solvent and then introducing the solvent into a polymer matrix. A polymer nanocomposite finds use in the preparation of fibers having a high strength, resiliency, and/or elasticity. Such fibers find use, e.g., in the preparation of textiles, ropes, and the like. The polymer nanocomposites also find use in the preparation of activated carbon filters. The polymer nanocomposites also find use in the preparation of filler or fiber reinforced composites, for example, epoxy vinyl ester and unsaturated polyester prepregs or B-stage systems that are cured to filler and fiber reinforced thermosetting plastic composites.

In addition, characteristics of conventional polymers are enhanced by the current technology. For example, the polymer nanocomposites find use in the production of rubber, e.g., for tires. Tires made from a polymer nanocomposite according to the technology (e.g., incorporating graphene and carbon nanotubes) have an improved dispersion of heat that otherwise limits the life of the tire. Polymer nanocomposites also attenuate incident ultraviolet radiation while being transparent to visible radiation; as such, polymer nanocomposites find use as a material to provide ultraviolet resistance, e.g., to minimize or eliminate degradation of a polymer from exposure to ultraviolet radiation.

Polymer nanocomposites find use as a synthesis scaffold for building biological materials, for example at the cell level, or for other chemical or biological syntheses.

EXAMPLES

Example 1—Graphene/Thermoplastic Polymer Master Batch

During the development of embodiments of the technology, polymer nanocomposites comprising graphene nanoplatelets were produced using a graphene/thermoplastic polymer master batch and tested.

1. Materials and Methods

Exfoliated graphene nanoplatelets (200 g) were prepared as a 0.5% solution or dispersion in N-methylpyrrolidone (NMP, Sigma-Aldrich, HPLC grade) from synthetic graphite (Sigma-Aldrich, <20 μm particle size) using solvent exfoliation methods, e.g., as described in U.S. Pat. Appl. Pub. No. 2011/0117361, which is incorporated herein by reference. The 0.5% solution or dispersion was concentrated by micropore filtration through a 0.2-micron nylon membrane filter until 90% of the solvent had permeated the membrane. Filtration left a 5% slurry of graphene nanoplatelets in NMP as the retentate. An equal volume of dry xylenes was added to the 5% graphene slurry and filtration was continued to reconcentrate the slurry to 5%. The xylenes dilution and reconcentration steps were carried out again to displace NMP with xylenes, resulting in a solvent composition that was approximately 75% xylenes and 25% NMP.

Separately, 120 melt polypropylene pellets (200 g) were dissolved in 2.0 L of xylenes (Sigma-Aldrich, ACS reagent grade) while stirring and heating to boiling. The polypropylene in xylenes solution was then high shear mixed at 8,000 rpm using a Silverson L5M-A lab mixer with the standard mixing assembly fitted with a square hole high shear mixing screen. The 5% graphene slurry (4.0 L) was added to the polymer solution and high shear mixing was continued for an additional 5 minutes. The mixture was allowed to cool overnight with constant agitation (e.g., on an orbital shaker), resulting in a viscous suspension. This viscous suspension was transferred to a rotary evaporator and the solvent was removed by rotary evaporation at ~10 mmHg pressure and a temperature of approximately 55° C. for xylenes removal and approximately 90° C. for NMP removal. Solvent removal left a wet cake containing about 50% solids. The wet cake was transferred to aluminum drying pans and dried in a vacuum oven at approximately 50 mmHg pressure and 100 to 120° C.

The graphene/polypropylene master batch (50% w/w graphene, as prepared above, 40% of final composition) was melt blended with a mixture of 2 melt polypropylene (23.7% of final composition), 12 melt polypropylene (29.6% of final composition), Engage 8003 (5% of final composition), and maleated polypropylene (1.7% of final composition) on a 26 mm co-rotating twin screw extruder. A reference composite containing the same polymer composition as above was produced using 20% graphite in place of the 20% graphene by blending under the same conditions except that the graphite was added into the extruder as powder along with the polymers.

2. Results

The test graphene composite and the control reference graphite composite were pelletized, injection molded, and subjected to mechanical and electrical tests (see Tables 1-3). The tensile data show that the graphene composite has 8% greater tensile strength and 12% greater elongation at break than the graphite reference composite. The graphene composite has 14% lower tensile modulus than the graphite reference composite, but withstands 141% greater force in the notched impact test and 153% greater force in the unnotched impact test. Regarding electrical properties, both composites showed very high surface resistivity that was not detectably different, but both composites showed volume resistivity of the same order of magnitude in the static dissipative range with the graphene composite being significantly less resistive (more conductive) than the graphite composite.

TABLE 1

Tensile data for graphene and graphite composite samples

| Sample | Tensile Strength (psi) | SD | Elongation (%) | SD | Tensile Modulus (psi) | SD |
|---|---|---|---|---|---|---|
| 20% Graphite | 4270 | 48.8 | 5.41 | 0.617 | 450000 | 13900 |
| 20% Graphene | 4630 | 10.1 | 6.09 | 0.175 | 385000 | 10900 |

TABLE 2

Impact data for graphene and graphite composite samples

| Sample | Notched Impact Ave Force (ft-lb/in) | SD | Type of Break | Unnotched Impact Ave Force (ft-lb/in) | SD | Type of Break |
|---|---|---|---|---|---|---|
| 20% Graphite | 0.46 | 0.04 | complete | 8.17 | 0.45 | complete |
| 20% Graphene | 1.11 | 0.10 | complete | 20.69 | 3.03 | hinged |

TABLE 3

Conductivity data for graphene and graphite composite samples

| Sample | Surface Resistivity (Ohm/sq) | SD | Volume Resistivity (Ohm-cm) | SD |
|---|---|---|---|---|
| 20% Graphite | >1.00E+12 | NA | 2.98E+9 | 6.19E+8 |
| 20% Graphene | >1.00E+12 | NA | 1.67E+9 | 2.70E+8 |

Example 2—Graphene/PVP Master Batch

During the development of embodiments of the technology, polymer nanocomposites comprising graphene nanoplatelets were produced using a graphene/PVP master batch and tested.

1. Materials and Methods

Exfoliated graphene nanoplatelets (100 g) were prepared as a 0.5% (by weight) solution or dispersion in N-methylpyrrolidone (NMP) from synthetic graphite (Sigma-Aldrich, <20 μm particle size) using solvent exfoliation methods, e.g., as described in U.S. Pat. Appl. Pub. No. 2011/0117361. The 0.5% solution or dispersion was concentrated by micropore filtration through a 0.2-micron nylon membrane filter until 90% of the solvent had permeated the membrane. Filtration left a 5% slurry of graphene nanoplatelets in NMP as the retentate. An equal volume of anhydrous methanol containing 1% dissolved PVP (number average molecular weight ($MW_n$)=3500 u) was added to the 5% graphene slurry and filtration was continued to reconcentrate the slurry to 5% graphene concentration. The methanol dilution and reconcentration steps were carried out repeatedly to displace NMP with methanol until the solvent composition was approximately 95% methanol and 5% NMP. Powdered PVP (100 g, $MW_n$=3500 u) was then dissolved in the slurry while warming at 40 to 50° C. The slurry was then high shear mixed for 10 minutes at 8,000 rpm using a Silverson L5M-A lab mixer with the standard mixing assembly fitted with a square hole high shear mixing screen. The slurry was then concentrated by boiling in an open beaker with constant stirring until increasing viscosity prevented further stirring. Heating was continued until a wet cake containing about 50% solvent by weight remained. The wet cake was then transferred to a vacuum oven and dried at 100° C. at 20 mmHg pressure until all residual solvent was removed. The final composition of the master batch was determined to be 45% by weight graphene and 55% by weight PVP.

The graphene/PVP master batch (as prepared above) was melt blended with 100% polyamide 6 on a 26-mm co-rotating twin screw extruder with a flat temperature profile at 240° C. and a screw speed of 250 rpm. The final composition of the extrudate was 81.25% polyamide 6, 10.31% PVP, and 8.44% graphene. Two types of control samples containing 100% polyamide 6 and containing 89.69% polyamide 6 and 10.31% PVP were extruded under the same conditions.

2. Results

The test and control samples were pelletized, injection molded, and subjected to tensile testing and dynamic mechanical analysis (3-point bending mode). Tensile data for the samples is summarized in Table 4 and the dynamic mechanical analysis (DMA) data are summarized in FIG. 1. The tensile data show that the graphene composite has 29% greater tensile strength and 74% greater tensile modulus than the control sample containing polyamide 6 and the same amount of PVP. The graphene composite has 12% greater tensile strength and 61% greater tensile modulus than the 100% polyamide 6 control sample. The DMA data show that the graphene composite has about 70% greater storage modulus at 25° C. and a significantly higher storage modulus up to 150° C. compared to the polyamide 6/PVP and 100% PA6 control samples.

TABLE 4

Tensile data for graphene composite and control samples

| Sample | Tensile Strength (psi) | SD | Tensile Modulus (psi) | SD |
|---|---|---|---|---|
| PA6 | 6680 | 133 | 262000 | 2570 |
| PA6/PVP | 5830 | 24 | 242000 | 3450 |
| PA6/PVP/Graphene | 7520 | 628 | 421000 | 61600 |

Example 3—Graphene/PVP/Polyamide Composites

During the development of embodiments of the technology provided herein, composites of graphene, PVP, and polyamide were produced from a graphene/PVP master batch and experiments were conducted to test the graphene/PVP/PA-6 composites.

1. Materials and Methods

During the development of embodiments of the technology provided herein, graphene/PVP master batches were prepared comprising a 50% loading of graphene. Exfoliated graphene nanoplatelets (260 g) were prepared as a 0.5% solution in N-methyl pyrrolidone ("NMP") (Sigma-Aldrich, HPLC grade) from synthetic graphite (Sigma-Aldrich, <20 μm particle size) using solvent exfoliation methods as described in U.S. Pat. Appl. Pub. No. 2011/0117361, which is incorporated herein by reference in its entirety. The 0.5% solution was concentrated by cross-flow micropore filtration on a filtration system (Sterlitech Sepa CF II) using a 0.2-micron nylon membrane filter until 88% of the solvent had permeated the membrane leaving a 4% slurry of graphene nanoplatelets in NMP as the retentate. An equal volume (~6500 mL) of methanol ("MeOH") (Sigma-Aldrich, ACS Reagent Grade) containing 0.010 g/mL dissolved poly(vinyl pyrrolidone) ("PVP") (Acros, 3500 MW) was added to the 4% graphene slurry and filtration was continued to re-concentrate the slurry to its original volume. The MeOH/PVP dilution and re-concentration steps were carried out three more times to displace NMP with MeOH to produce a final solvent composition that was approximately 5% NMP and 95% MeOH. The PVP-graphene-solvent mixture was then high shear mixed at 8000 rpm using a lab mixer (Silverson L5M-A) with the standard mixing assembly fitted with a square-hole high shear mixing screen. The mixture was then concentrated by rotary evaporation at ~10 mm Hg of pressure and at a temperature of approximately 40° C. (for MeOH removal) and approximately 90° C. (for NMP removal) to produce a thick slurry containing about 25% solids. The slurry was transferred to aluminum drying pans and dried in a vacuum oven at approximately 30 mm Hg pressure and 120° C. to 150° C.

Then, during the development of embodiments of the technology provided herein, a graphene/PVP master batch comprising a 50% loading of graphene was melt blended with polyamide. A graphene/PVP master batch (prepared as described above) was melt blended with film grade polyamide 6 (PA-6, Ashlene 851, Ashley Polymers) on a 26-mm co-rotating twin screw extruder with a flat temperature profile at 240° C. and screw speed of 250 rpm. Various let-down ratios were run to produce final composite compositions with 1.0%, 1.5%, 2.7%, 4.0%, and 7.0% graphene loading by weight. 100% film grade polyamide 6 was extruded under the same conditions for use as a control polymer and all extrudates were pelletized. Blown films with average thicknesses of about 1 mil were made from each of the extrudates and the films were tested for tensile properties by Akron Rubber Development Laboratory Inc. (ARDL, Akron, Ohio).

2. Results

Figure 2:
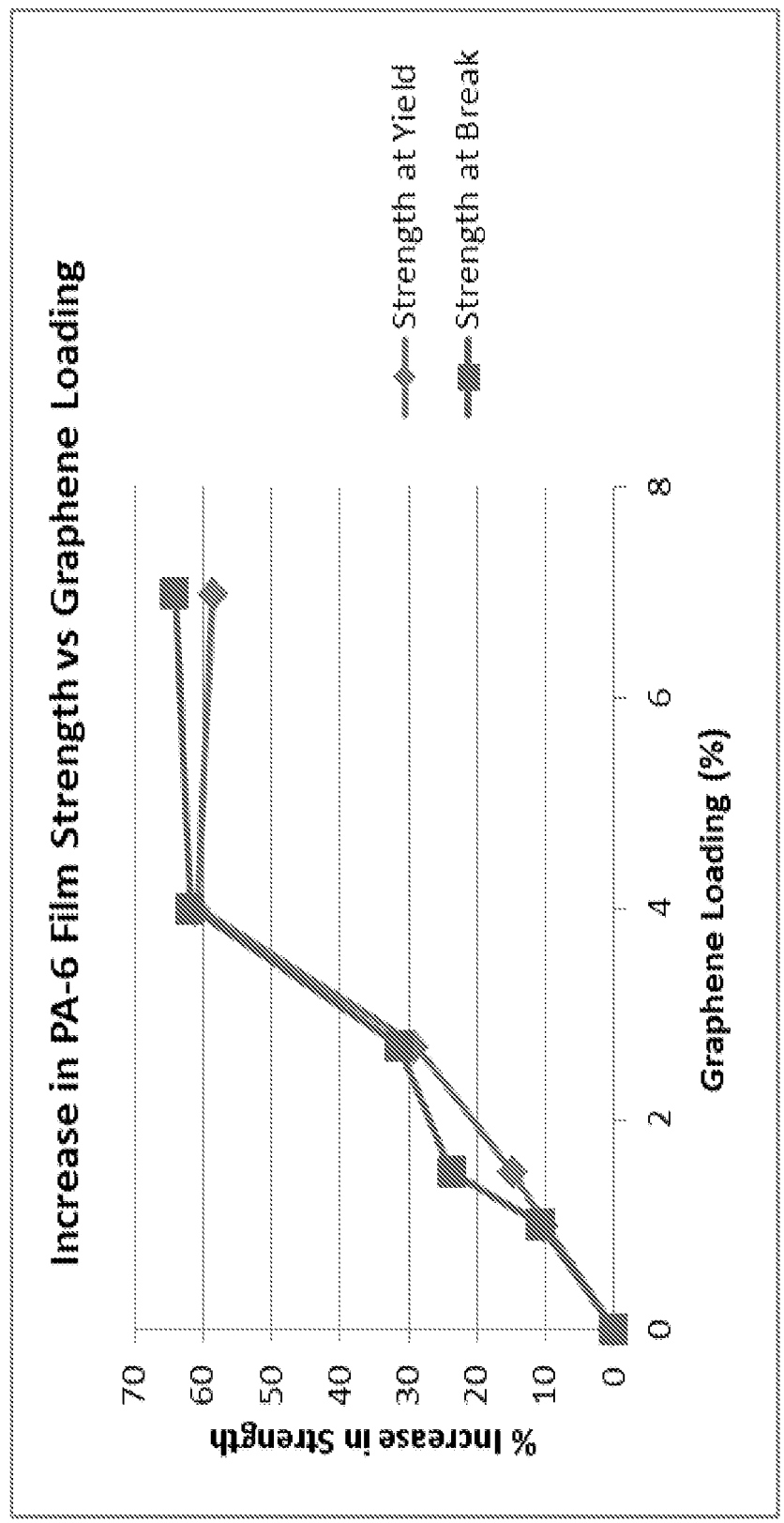
FIG. 2 is a plot showing the tensile strength of graphene/PVP/polyamide composites as a function of graphene loading.

During the development of embodiments of the technology provided herein, experiments were conducted to test the tensile properties of graphene/PVP/PA-6 composite films produced as described above (see FIG. 2). The data indicated that all of the graphene composites showed a significant increase in tensile strength at yield and tensile strength at break versus the PA-6 only control and the magnitude of increase shows a strong positive correlation with graphene levels up to 4% loading (FIG. 2). The absence of a significant further increase in tensile strength between 4% and 7% loading is consistent with overloading of the nanomaterial and compromised dispersion at the 7% loading level (FIG. 2).

Figure 3:
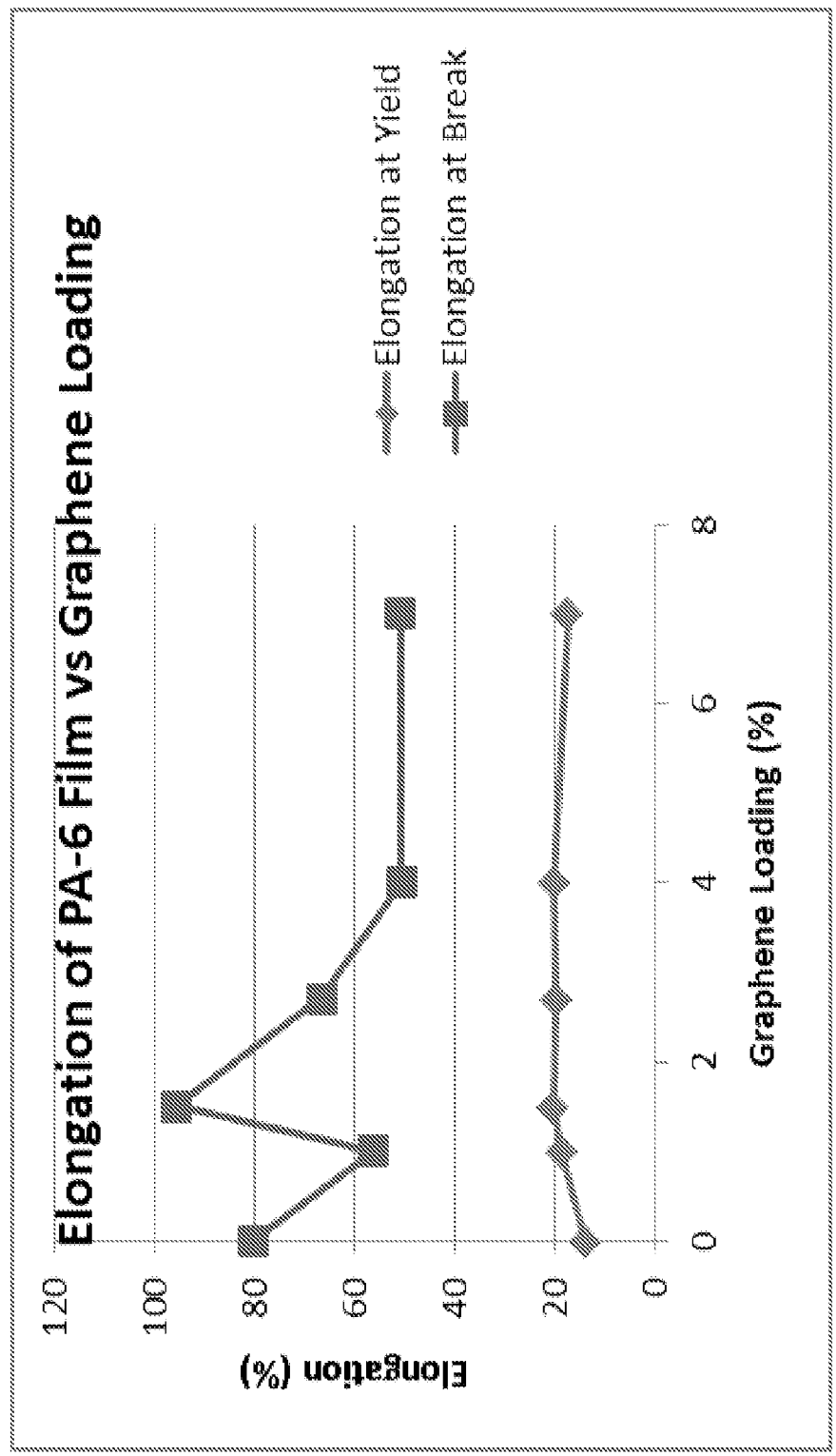
FIG. 3 is a plot showing data from tests of elongation for graphene/PVP/polyamide composites as a function of graphene loading.

Further, during the development of embodiments of the technology provided herein, elongation data were collected for the graphene/PVP/PA-6 composite films (see FIG. 3). The data indicated that there was essentially no change in the % elongation at yield for the graphene composite films versus the PA-6 control film (FIG. 3). There was significant variability in the % elongation at break with a relatively small net decrease with increased graphene loading versus the PA-6 control film (FIG. 3).

Overall, the tensile data on the PA-6 films indicate a strong improvement in tensile strength with graphene loadings up to 4% with minimal tradeoff of elongation.

Example 4—Graphene/Linear Low Density Polyethylene Composite

During the development of embodiments of the technology provided herein, composites of graphene and linear low density polyethylene (LLDPE) were produced from a graphene/LLDPE master batch and experiments were conducted to test the graphene/LLDPE composites.

1. Materials and Methods

During the development of embodiments of the technology provided herein, graphene/LLDPE master batches were prepared comprising a loading of 50% graphene. Exfoliated graphene nanoplatelets (8 g) were prepared as a 0.7% solution in NMP (Sigma-Aldrich, HPLC grade) from synthetic graphite (Asbury Carbons, <200 mesh) using solvent exfoliation methods as described in U.S. Pat. Appl. Pub. No. 2011/0117361, which is incorporated herein by reference in its entirety. The 0.7% solution was concentrated by vacuum filtration through a 0.45-micron nylon membrane filter until 80% of the solvent had permeated the membrane, producing a slurry comprising 20% of the solvent volume and a graphene wet cake. The remaining solvent, wet cake, and nylon membrane filter were collected together in a glass jar, which was then sonicated in an ethylene glycol bath for 10 minutes to redisperse the wet cake into the remaining solvent. The nylon filter was discarded. Separately, 8 grams of LLDPE (Dow 5230G) were dissolved in 400 mL xylenes (Sigma-Aldrich, ACS Reagent grade) while stirring and heating at boiling. The concentrated graphene slurry was slowly added to the LLDPE solution under continued stirring and heating and the mixture was then high shear mixed at 8000 rpm using a lab mixer (Silverson L5M-A) with the standard mixing assembly fitted with a square-hole high shear mixing screen. The mixture was allowed to cool under continuous magnetic stirring. Next, the resulting slurry was concentrated by rotary evaporation at ~10 mm Hg pressure and at a temperature of approximately 60° C. (for xylenes removal) and approximately 90° C. (for NMP removal) to produce a thick slurry containing about 20% solids. The slurry was transferred to aluminum foil and dried in a vacuum oven at approximately 30 mm Hg pressure and 140° C.

Then, during the development of embodiments of the technology provided herein, a graphene/LLDPE master batch comprising a 50% loading of graphene was melt blended with additional LLDPE. In particular, a graphene/LLDPE master batch with 50% graphene loading (prepared as described above) was used to produce a graphene/LLDPE composite with a 3% graphene loading. One part of the master batch was mixed with 15.7 parts by weight of LLDPE (Dow 5230G) to produce a final composite with a graphene loading of 3.0% by weight. The mixed sample was melt blended on a conical twin screw micro-compounding extruder (DACA) at a screw rotation of 31 rpm (at a preload of 50 N) and at a temperature of 190° C. for 3 minutes, then extruded. The extrudate was formed into a 4-inch by 4-inch by 0.008-inch film on a Carver Press at 10,000 lbf and 356° F. The resultant film was tested for tensile properties by Akron Rubber Development Laboratory Inc. (ARDL, Akron, Ohio).

2. Results

During the development of embodiments of the technology provided herein, experiments were conducted to test the tensile properties of the graphene/LLDPE composite (film) produced from melt compounding of the 50% graphene/LLDPE master batch with LLDPE. The data collected indicated that the LLDPE film containing 3% graphene, prepared from a master batch as described above, showed a 9% greater tensile strength at yield and 41% greater tensile strength at break than a similarly prepared LLDPE control film. Further, the data indicated that the 3% graphene film showed a 37.9% elongation at yield and a 1,228% elongation at break compared to a 31.6% elongation at yield and a 895% elongation at break for the control film.

Example 5—Graphene/High Density Polyethylene Composites

During the development of embodiments of the technology provided herein, composites of graphene and high density polyethylene (HDPE) were produced from a graphene/HDPE master batch and experiments were conducted to test the graphene/HDPE composites.

1. Materials and Methods

During the development of embodiments of the technology provided herein, graphene/HDPE master batches were prepared comprising a loading of 20% graphene. Exfoliated graphene nanoplatelets (100 g) were prepared as a 0.5% solution in NMP (Sigma-Aldrich, HPLC grade) from synthetic graphite (Asbury Carbons, <200 mesh) using solvent exfoliation methods as described in U.S. Pat. Appl. Pub. No. 2011/0117361, which is incorporated herein by reference. The 0.5% solution was concentrated by rotary evaporation at ~10 mm Hg pressure and at a temperature of approximately 100° C. until 90% of the solvent had been removed to produce a 5% slurry of graphene nanoplatelets in NMP. Separately, HDPE (Lyondell Basell LP540200, "Petrothene") pellets were dissolved in xylenes (Sigma-Aldrich, ACS reagent grade) at 1 g per 100 ml while stirring and heating at boiling. The 5% graphene slurry was slowly added to the HDPE solution under continued stirring and heating, and then the mixture was high shear mixed at 8000 rpm using a lab mixer (Silverson L5M-A) with the standard mixing assembly fitted with a square-hole high shear mixing screen. The mixture was allowed to cool under continuous magnetic stirring. Next, the cooled slurry was centrifuged at 3000 rpm for 20 minutes at 0° C. and decanted. The solids were collected and transferred to aluminum drying pans and dried in a vacuum oven at approximately 30 mm Hg pressure and 140° C.

Then, during the development of embodiments of the technology provided herein, a graphene/PVP master batch (prepared as described above) was melt blended with HDPE (Lyondell Basell LP540200, "Petrothene") at ratios to produce final composite loadings of 0.5%, 1.0%, 2.0%, and 5.0% graphene. The blends were extruded on a 26-mm co-rotating twin screw extruder with a flat temperature profile at 160° C. and a screw speed of 250 rpm. 100% HDPE was extruded under the same conditions for use as a control polymer. All extrudates were pelletized and injection molded into test bars for tensile and DMA testing.

2. Results

Figure 4:
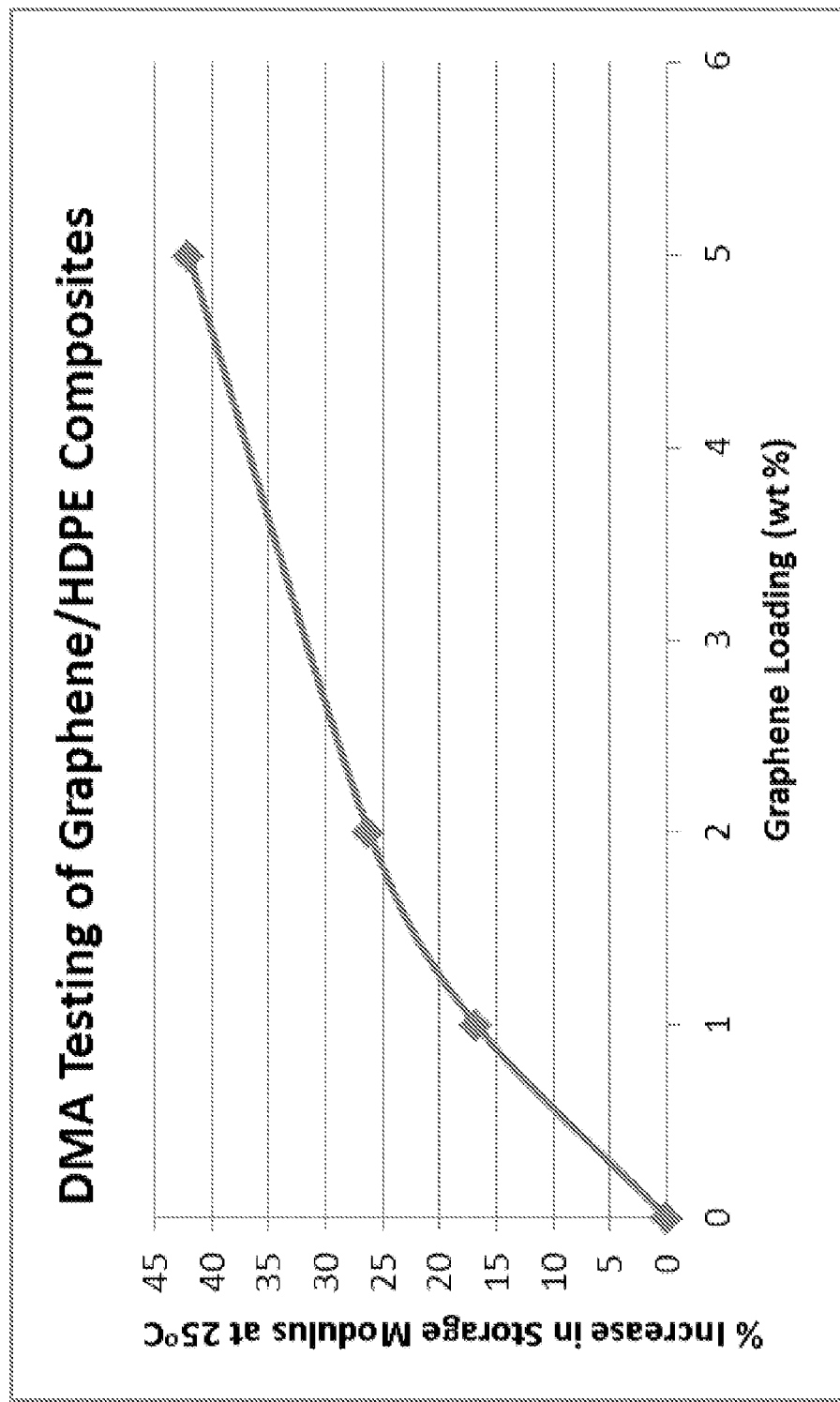
FIG. 4 is a plot showing data from dynamic mechanical analysis tests of storage modulus for graphene/HDPE composites as a function of graphene loading.

During the development of embodiments of the technology provided herein, experiments were conducted to test the physical characteristics (e.g., dynamic mechanical analysis, "DMA") of the graphene/HDPE composites produced from melt compounding of 20% graphene/HDPE master batches (see FIG. 4). The data collected indicated that there was an increase in storage modulus (at 25° C. from DMA in 3-point bending mode) as a function of graphene loading for the graphene/HDPE composites. Further, the data indicated that there was a regular and significant increase in storage modulus with increased graphene loading reaching 42% increase at 5% loading.

Further, data were collected from testing the tensile strength of the graphene/HDPE composites (Table 5). The data indicated that there was a relatively small but regular increase in tensile strength and tensile modulus as a function of the graphene loading level from 0% to 5%. In particular, at a 5% loading, the graphene/HDPE composite shows a 7.3% greater tensile strength and a 15.7% greater tensile modulus than the HDPE only control.

TABLE 5

Tensile data for graphene/HDPE composites and controls

| % Graphene Loading | Tensile Strength (psi) | Standard Deviation | Tensile Modulus (psi) | Standard Deviation |
|---|---|---|---|---|
| 0.0 | 2300 | 29 | 79800 | 3980 |
| 0.5 | 2330 | 22 | 82600 | 3840 |
| 1.0 | 2340 | 9 | 79800 | 3950 |
| 2.0 | 2390 | 7 | 83100 | 5760 |
| 5.0 | 2470 | 40 | 92300 | 5410 |

Example 6—Graphene/Epoxy Composites

During the development of embodiments of the technology described herein, an epoxy resin master batch comprising a loading of 10% by weight of exfoliated graphene nanoplatelets was prepared and used to make graphene/epoxy composites containing various lower loadings of graphene.

1. Materials and Methods

Exfoliated graphene nanoplatelets (1.95 g) were prepared as a 0.53% solution or dispersion in N-methylpyrrolidone (NMP, Sigma-Aldrich, HPLC grade) from synthetic graphite (Sigma-Aldrich, <20 µm particle size) using solvent exfoliation methods described in U.S. Pat. Appl. Pub. No. 2011/0117361, which is incorporated herein by reference. Then, the dispersion was suction filtered in a Buchner funnel using a 0.45-µm nylon membrane filter to remove most of the solvent leaving a wet cake. Next, the wet cake was washed with acetone (Sigma-Aldrich, ACS reagent grade) with continued suction filtration to remove excess acetone. The resultant wet cake was stirred into an amount of liquid epoxy resin (Dow DER 332) to achieve a final total carbon loading of 10% by weight in a cured composite (i.e. after addition of hardener). Each resin was diluted with approximately 40 ml of acetone and high shear mixed for one hour at 5,000 rpm using a Silverson L5M-A lab mixer with the standard mixing assembly fitted with a square hole high shear mixing screen. The resultant dispersion was transferred to a round bottom flask and the acetone was removed at reduced pressure on a Buchi R-200 rotary evaporator with continued heating at 95° C. to remove the residual solvent (e.g., NMP).

The graphene/epoxy resin master batch was divided into aliquots. One aliquot was mixed with epoxy hardener (Dow, DEH 20), poured onto foil in a thin layer (e.g., having a thickness of approximately 2 mm), and cured by heating on a hot plate at 120° C. for 4 hours. Additional cured test samples with lower loadings of the nanomaterials were prepared by diluting the remaining aliquots with epoxy resin before adding the hardener and curing the samples under the same conditions.

2. Results

Figure 5:
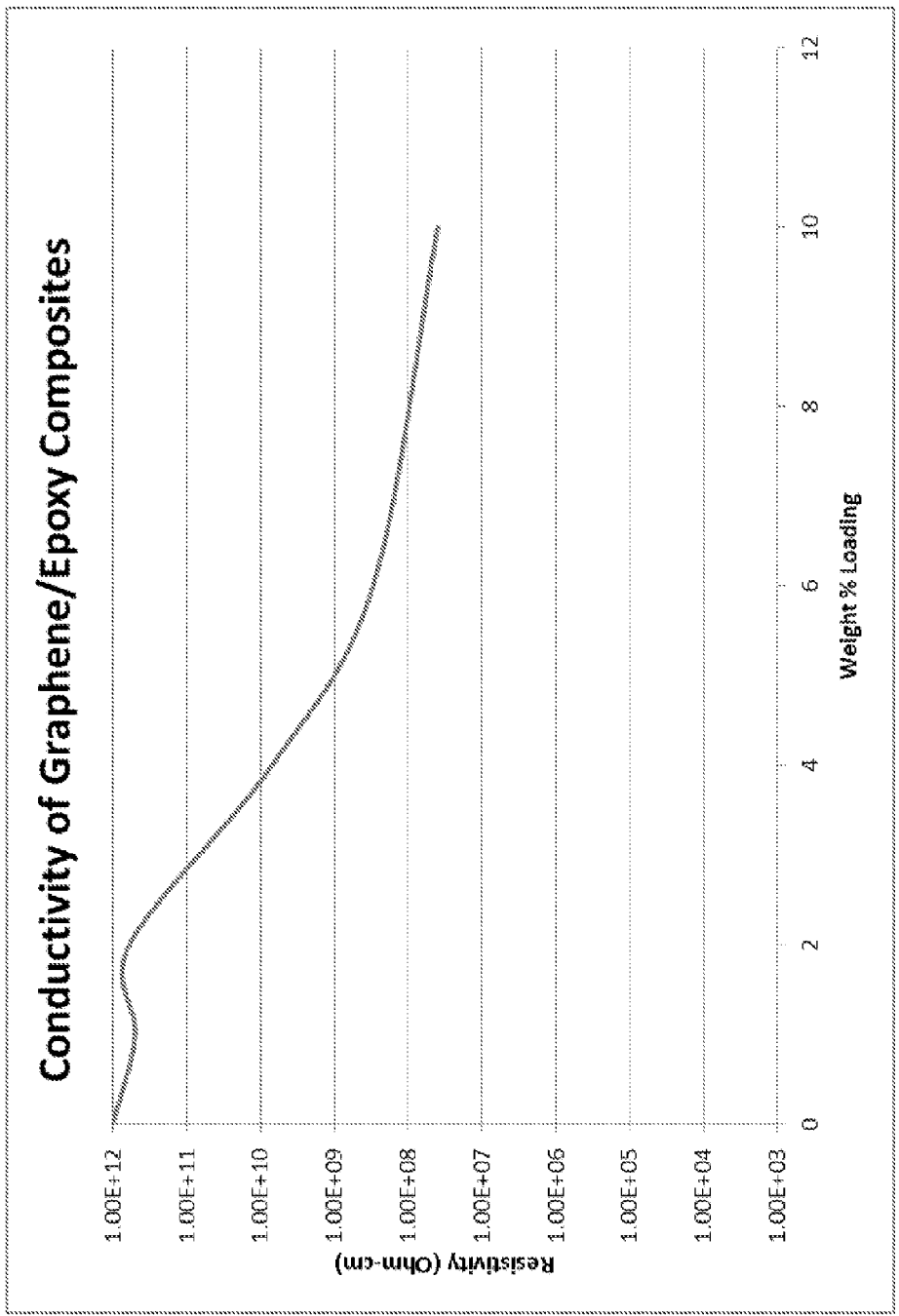
FIG. 5 is a plot of resistivity as a function of graphene loading for graphene/epoxy composites produced from a 10% graphene/epoxy resin master batch.

During the development of embodiments of the technology provided herein, graphene/epoxy nanocomposites prepared as described above were tested for electrical resistivity using a megohmmeter (Static Solutions RT-1000). Electrical resistivity data were collected from tests of the epoxy composite samples (FIG. 5). In particular, electrical resistivity data were collected as a function of graphene loading. Resistivity of the composites decreases with increased graphene loading from $1 \times 10^{12}$ ohm-cm for the epoxy only control to $4 \times 10^7$ ohm-cm for the composite with 10% graphene. Polymers with volume electrical resistivities less than $10^{11}$ Ohm-cm, but greater than $10^4$ Ohm-cm, have electrostatic charge dissipation (ESD) properties that are useful in many applications.

Figure 6:
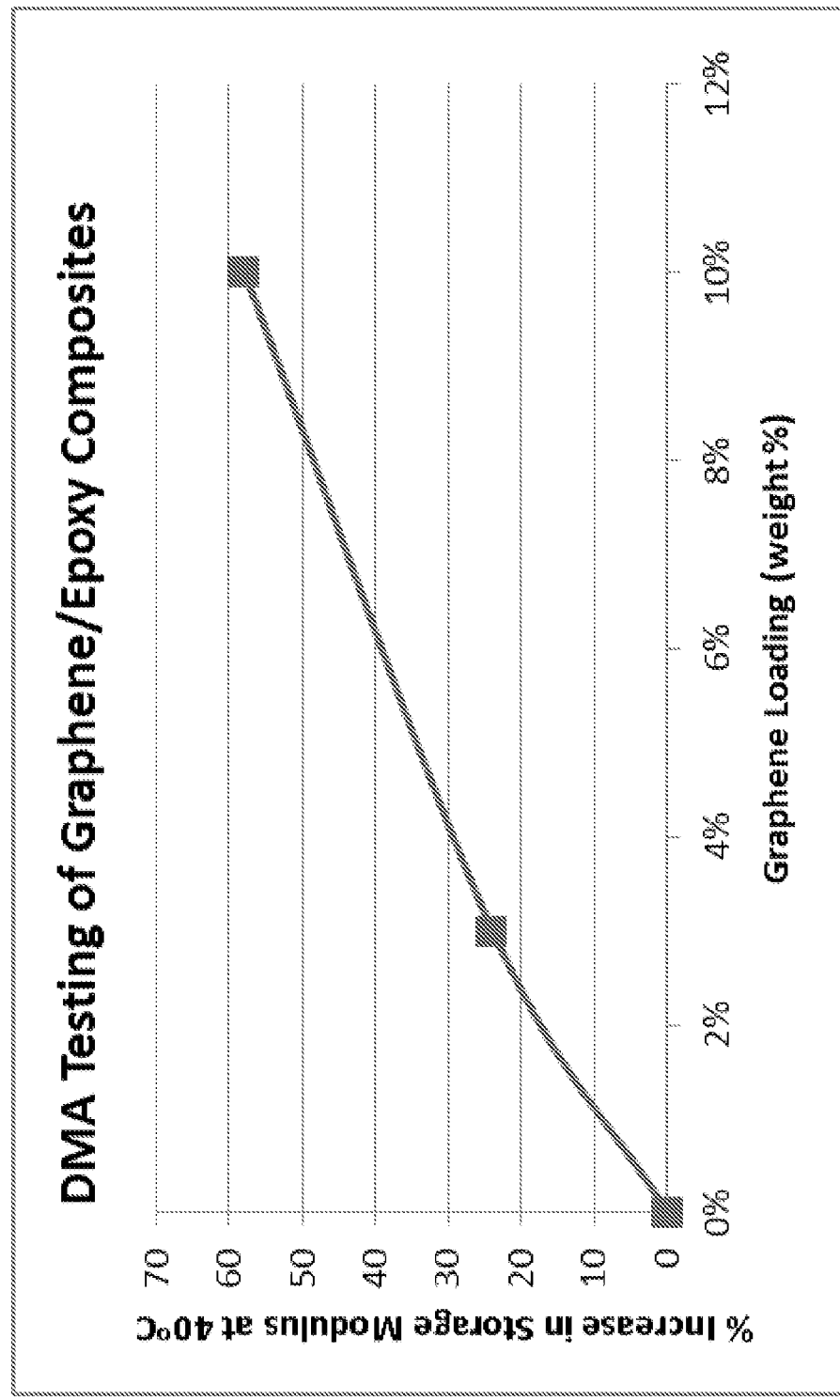
FIG. 6 is a plot showing data from dynamic mechanical analysis tests of storage modulus for graphene/epoxy composites as a function of graphene loading.

Samples of a graphene/epoxy nanocomposites containing 3% and 10% graphene, prepared as described above were cured in the form of test bars of dimensions 10 cm length by 1 cm width by 1 mm thickness, and analyzed by dynamic mechanical analysis (DMA, 3-point bending mode). The increases in storage modulus a 40° C. for the composite samples versus a similarly prepared epoxy only control sample are summarized in FIG. 6. The 3% graphene composite showed a 24% greater storage modulus and the 10% graphene sample showed a 58% greater storage modulus versus the epoxy control.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A master batch composition for making a polymer nanocomposite, the master batch composition comprising a polymer, wherein the polymer is a poly(vinyl lactam), a polyacrylamide, a thermoplastic polymer, thermoset polymer, polyethylene polymer, polypropylene polymer, polycarbonate polymer, unsaturated polyester, polyvinylchloride, or epoxy vinyl ester, or epoxy and at least 20% by weight exfoliated graphene.

2. The master batch composition of claim 1 comprising graphene and a poly(vinylpyrrolidone) in a weight ratio of 1:1 to 1:4.

3. The master batch composition of claim 1 comprising graphene and a thermoplastic polymer in a weight ratio of 1:1 to 1:4.

4. The master batch composition of claim 1 wherein the average thickness of the graphene is less than 10 atomic layers, a minimum of 5% of the graphene is single atomic layer graphene, and the oxygen content of the graphene is less than 1%.

5. The master batch composition of claim 1 wherein less than 10% of the graphene nanoplatelets have a maximum diameter of less than 0.5 microns.

6. The master batch composition of claim 1 comprising a poly(vinylpyrrolidone) that has a number average molecular weight of less than or equal to approximately 10,000 u.

7. A method of making a master batch composition for producing a polymer nanocomposite, the method comprising:
    a) mixing a slurry of graphene, wherein the slurry of graphene is produced by:
        i) treating graphite in an N-alkyl-pyrrolidone to produce solvent exfoliated graphene in the N-alkyl-pyrrolidone;
        ii) removing most of the N-alkyl-pyrrolidone to produce a concentrated solution or dispersion of graphene in the N-alkyl-pyrrolidone; and
        iii) adding a solvent to the graphene in N-alkyl-pyrrolidone to produce the slurry of graphene in the solvent system in a solvent system with a polymer; and
    b) removing the solvent system to produce a master batch comprising from 20% to 60% exfoliated graphene.

8. The method of claim 7 wherein the mixing is high shear mixing.

9. The method of claim 7 wherein the polymer is a polyvinyl lactam or a thermoplastic polymer.

10. The method of claim 7 wherein the solvent is xylenes or methanol.

11. The method of claim 7 wherein the concentrated solution or dispersion of graphene in the N-alkyl-pyrrolidone comprises 2% to 8% graphene.

12. The method of claim 7 comprising filtration to remove the N-alkyl-pyrrolidone.

13. The method of claim 7 wherein the solvent system comprises 2% to 30% N-alkyl-pyrrolidone and 70% to 98% solvent.

14. A method of making a graphene/thermoplastic master batch consisting of the steps:
    a) concentrating a solution or stable dispersion of exfoliated graphene above the solubility and stable dispersion limit of the exfoliated graphene;
    b) dissolving a thermoplastic polymer in the graphene/solvent slurry in a ratio of 1:1 to 1:5 graphene to polymer; and
    c) removing the solvent with continuous mixing to isolate the resultant graphene/polymer master batch as a solid.

15. A method of making a graphene/polymer master batch, the method comprising:
    a) exfoliating graphene in a polymerizable solvent, wherein the polymerizable solvent is N-vinyl pyrrolidone or N,N-dimethyl acrylamide to provide a dispersion of exfoliated graphene in the polymerizable solvent;
    b) polymerizing the polymerizable solvent to produce a graphene/polymer master batch.

* * * * *